(12) United States Patent
Jackson et al.

(10) Patent No.: US 7,177,953 B1
(45) Date of Patent: Feb. 13, 2007

(54) DEVICE AND METHOD FOR DATA STORAGE

(75) Inventors: Stephen S. Jackson, Chapel Hill, NC (US); Ottis K. Black, III, Raleigh, NC (US)

(73) Assignee: Nortel Networks Limited (CA)

( * ) Notice: Subject to any disclaimer, the term of this patent is extended or adjusted under 35 U.S.C. 154(b) by 722 days.

(21) Appl. No.: 09/748,757

(22) Filed: Dec. 22, 2000

(51) Int. Cl.
*G06F 15/16* (2006.01)
*G06F 1/00* (2006.01)

(52) U.S. Cl. ............................ 709/250; 249/216
(58) Field of Classification Search ............... 709/206, 709/211–229, 249–250; 713/300, 310
See application file for complete search history.

(56) References Cited

U.S. PATENT DOCUMENTS

| | | | |
|---|---|---|---|
| 6,295,356 B1 * | 9/2001 | De Nicolo | 379/413 |
| 6,523,696 B1 * | 2/2003 | Saito et al. | 709/223 |
| 6,535,983 B1 * | 3/2003 | McCormack et al. | 713/310 |
| 6,546,494 B1 * | 4/2003 | Jackson et al. | 713/300 |
| 6,574,704 B1 * | 6/2003 | Ishida | 711/114 |
| 6,640,308 B1 * | 10/2003 | Keyghobad et al. | 713/300 |
| 6,651,117 B1 * | 11/2003 | Wilson et al. | 710/33 |
| 6,701,443 B1 * | 3/2004 | Bell | 713/300 |

FOREIGN PATENT DOCUMENTS

WO    WO 200174015 A1 * 10/2001

OTHER PUBLICATIONS

ATX Specification Version 2.01, Intel, Feb. 1997.*

* cited by examiner

*Primary Examiner*—Krisna Lim
*Assistant Examiner*—Yasin Barqadle
(74) *Attorney, Agent, or Firm*—McGuinness & Manaras LLP (57) ABSTRACT

A data storage device that may be connected directly to a power integrated network includes a network interface configured to communicate with the power integrated network and a memory configured to store data. The data storage device also includes a control module to control the transmission of data from the memory to the power integrated network and the storage of data received from the power integrated network in the memory. A power module in the data storage device receives power from the power integrated network. The power module converts the power received from the power integrated network to a voltage level that may be used to power the data storage device.

20 Claims, 5 Drawing Sheets

DEVICE AND METHOD FOR DATA STORAGE

FIELD OF THE INVENTION

The invention generally relates to communication networks and, more particularly, the invention relates to data storage devices that may receive power and data from a communication network.

BACKGROUND OF THE INVENTION

Figure 1A:
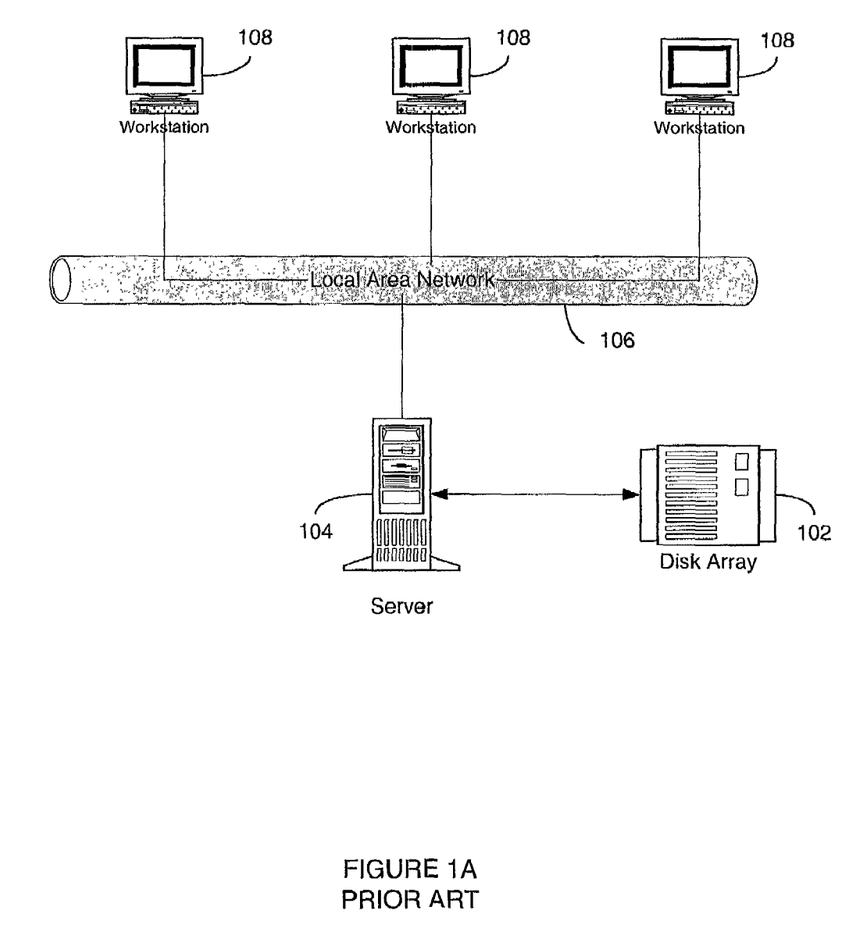
FIG. 1A is a schematic diagram of a prior art local area network ("LAN") including a storage device.

There are a number of approaches to providing data storage in networks (e.g., intranets and other local networks). A basic approach is to connect a storage device (e.g., a disk drive, RAID array, tape drive or optical drive) to another network device in the local area network, such as a server or personal computer, using an interface such as the Small Computer System Interface ("SCSI"). The SCSI interface allows network devices, such as a server, to communicate with peripheral devices such as disk drives, tape drives, CD-ROM drives and printers. FIG. 1A is a block diagram of a local area network 106 with a disk array 102 coupled to the local area network 106 through server 104. As shown in FIG. 1A, the server 104 acts as a pathway between the disk array 102 and the local area network 106. The local area network 106 may be any type of local area network, such as a local area network that operates according to the Ethernet protocol.

Figure 1B:
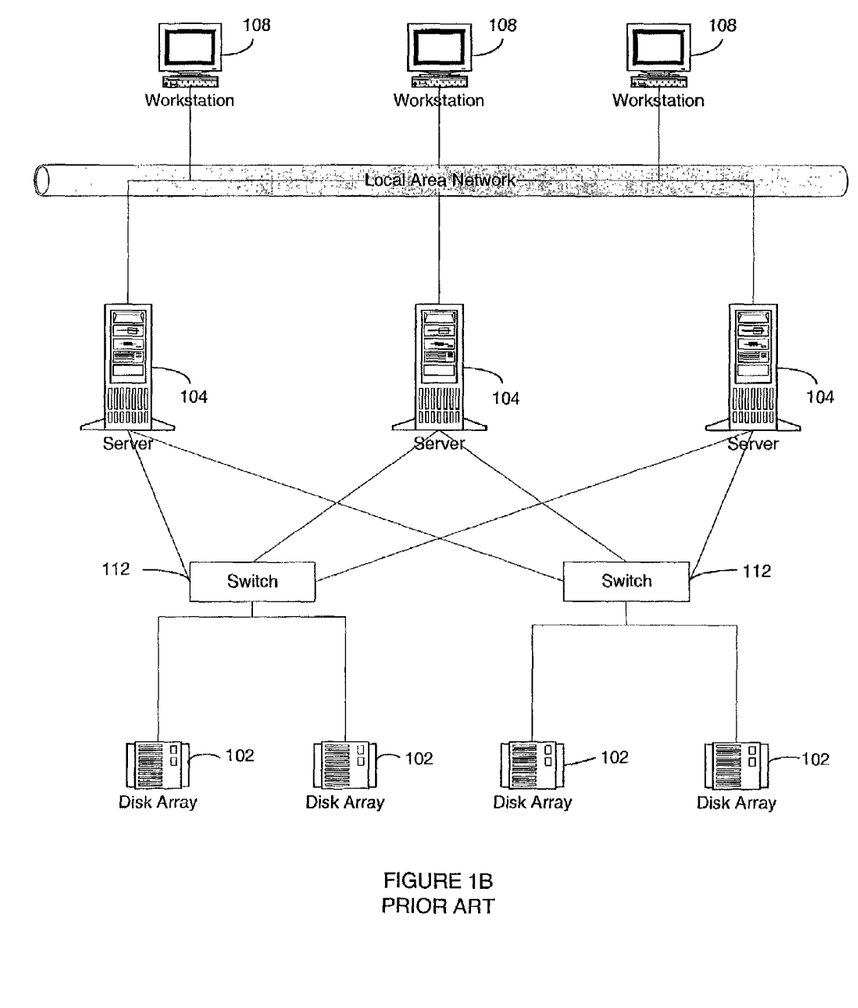
FIG. 1B is a schematic diagram of a prior art storage area network ("SAN") coupled to a local area network.

An alternative approach is a storage area network ("SAN") as shown in FIG. 1B. A SAN architecture allows storage resources (i.e., disk arrays 102) to be shared among multiple network devices (e.g., servers 104) in the local area network 106. The disk arrays 102 are attached to the servers 104 using, for example, switches 112. Typically, the disk arrays 102 are connected using a high-speed interconnection, such as Fibre Channel technology. The SAN architecture provides any-to-any connectivity between the servers 104 and the disk arrays 102. As shown in FIG. 1B, the disk arrays 102 are coupled to the local area network 106 via the switches 112 and the servers 104.

SUMMARY OF THE INVENTION

In accordance with one aspect of the invention, a data storage device for use in a power integrated network includes a memory configured for storing data and a control module coupled to the memory that controls the transmission of data from the memory to the power integrated network and the storage of data received from the power integrated network in the memory. In addition, a power module is coupled to the memory and the control module. The power module receives power from the power integrated network to energize the data storage device. The data storage device may further include a network interface coupled to the control module where the network interface is configured to communicate with the power integrated network. The control module may package data for transmission over the power integrated network.

In one embodiment, the power integrated network is a Power Ethernet network. The memory area may be a device including a SCSI interface. In another embodiment, the power module includes a power converter for converting the power received from a first voltage level to a second voltage level. The second voltage level may be lower than the first voltage level.

In accordance with another aspect of the invention, a method for providing data storage in a power integrated network includes coupling a data storage device to the power integrated network where the data storage device is configured to communicate with the power integrated network and receiving data and power at the data storage device from the power integrated network. The power received from the power integrated network is used to energize the data storage device. In one embodiment, the power integrated network is a Power Ethernet. The method may also include converting the power received from the power integrated network from a first voltage level to a second voltage level. The second voltage level may be lower than the first voltage level.

In accordance with yet another aspect of the invention, a system for providing data storage in a communication network includes a first power integrated network and a second power integrated network coupled to a specified network so that data may be transmitted from and received by the first power integrated network and the second power integrated network across the specified network. The first power integrated network and the second power integrated network provide data and power. A first data storage device is coupled to the first power integrated network where the first data storage device is configured to communicate with the first power integrated network and to receive power from the first power integrated network. A second data storage device is coupled to the second power integrated network where the second data storage device is configured to communicate with the second power integrated network and to receive power from the second power integrated network.

In one embodiment, the first power integrated network and the second power integrated network are Power Ethernet networks. The specified network may be the Internet. In another embodiment, the first storage device and the second storage device are in a RAID configuration. In yet another embodiment, the first data storage device includes a memory configured to store data and a control module coupled to the memory area that controls the transmission of data from the memory to the first power integrated network and the storage of data received from the first power integrated network in the memory. The first data storage device further includes a power module coupled to the memory and the control module. The power module receives power from the first power integrated network to energize the first data storage device. In one embodiment, the memory may be a device including a SCSI interface.

In another embodiment, the first data storage device includes a network interface coupled to the control module where the network interface is configured to communicate with the first power integrated network. The control module may package data for transmission over the first power integrated network. In yet another embodiment, the power module includes a power converter for converting the power received from a first voltage level to a second voltage level. The second voltage level may be lower than the first voltage level.

In a further embodiment, the second data storage device includes a memory configured for storing data and a control module coupled to the memory that controls the transmission of data from the memory to the second power integrated network and the storage of data received from the second power integrated network in the memory. The second data storage device further includes a power module coupled to the memory and the control module. The power module receives power from the second power integrated network to energize the second data storage device. The memory may be device including a SCSI interface.

In another embodiment, the second data storage device includes a network interface coupled to the control module where the network interface is configured to communicate with the second power integrated network. The control module may package data for transmission over the second power integrated network. In yet another embodiment, the power module includes a power converter for converting the power received from a first voltage level to a second voltage level. The second voltage level may be lower than the first voltage level.

BRIEF DESCRIPTION OF THE DRAWINGS

The foregoing description of various embodiments of the invention should be appreciated more fully from the following further description thereof with reference to the accompanying drawings wherein.

DESCRIPTION OF PREFERRED EMBODIMENTS

In an embodiment of the present invention, a data storage device is provided that may be connected to a power integrated network (e.g., a local area network implementing Power Ethernet, discussed below). The data storage device includes a memory configured to store data and a control module for controlling the transfer of data between the memory and the power integrated network across the network interface. The data storage device also includes a power module for receiving and converting power from the power integrated network. The power received from the power integrated network is used to energize the components of the data storage device. Accordingly, the data storage device is able to receive both data and power from the power integrated network.

As used herein, the term "power integrated network" refers to a local network that transmits both power and data to member computer systems (e.g., network appliances, personal computers, or servers) in the network. Such power may or may not be used by the member computer systems. Among other ways, the power and data may be transmitted on a single cable via different wires, or via the same wire. Illustrative power integrated networks include Power Ethernet networks, which implement the proposed IEEE 802.3af standard. Currently, this standard is in draft form and is expected to be completed and adopted sometime in late 2001. Computer systems utilizing this standard are capable of receiving power (e.g., about fourteen watts) and data from a computer cable across an IEEE DTE (data terminal equipment) through a MDI (media dependent interface) compliant port. In addition, a Power Ethernet network may determine whether devices coupled to the network are capable of receiving power from the network.

It should be noted that the term "data" is used herein to broadly represent any type of information that may be electronically transmitted across a network. Such information may include, among other things, information commonly referred to as audio, video, signaling, control and data. In addition, instead of using the term "datum", the term "data" is used herein to represent both the singular and plural form of the term "datum."

Figure 2:
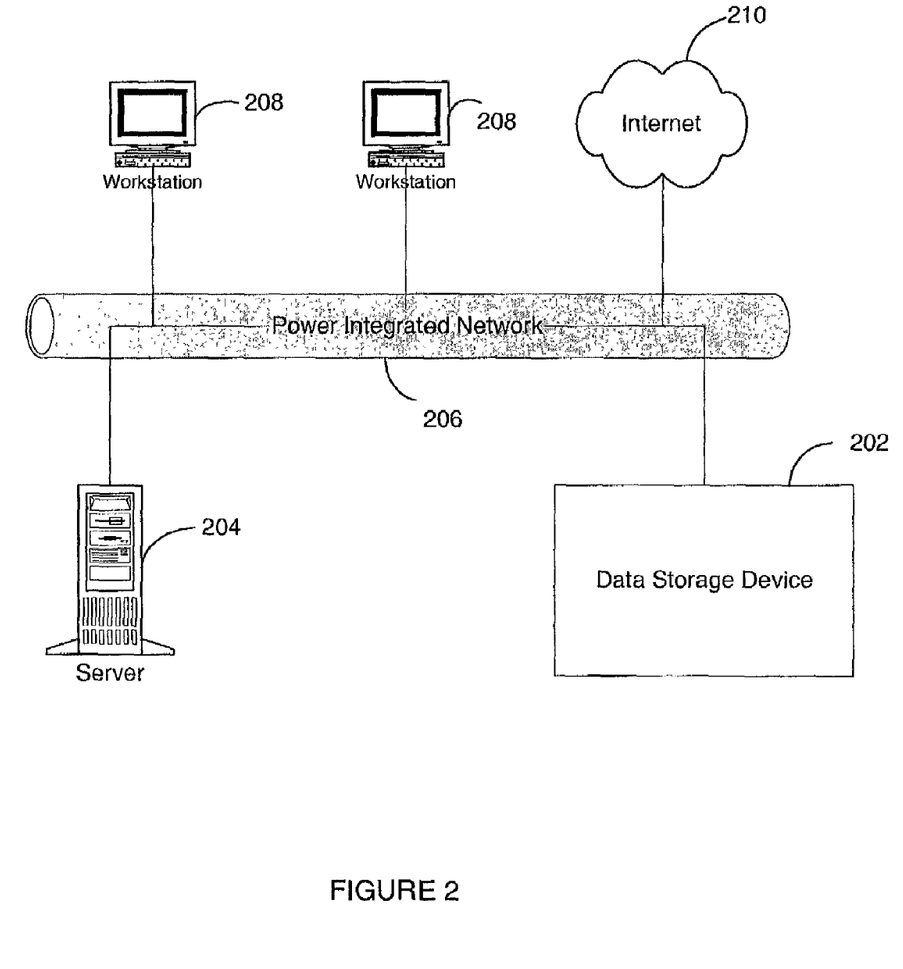
FIG. 2 is a schematic diagram of a data storage device in a power integrated network in accordance with an embodiment of the invention.

FIG. 2 is a schematic diagram of a power integrated network 206 that includes a number of network devices, i.e., workstations 208, a server 204 and a data storage device 202. Server 204 may be any type of server used in a local area network, such as, for example, a stand-alone hardware server, or a server implemented as software on a router or a multiplexer. The power integrated network 206 is also coupled to a public network 210, i.e., the Internet 210, in order to communicate with remote network devices in other networks. It should be noted that a different number of servers 204, workstations 208 and data storage devices 202 than that shown in FIG. 2 may be used in the power integrated network 206.

Data storage device 202 is advantageously configured so that it may be connected to the power integrated network 206 to receive both power and data rather than coupled to the power integrated network via another network device, such as server 204. Accordingly, data storage device 202 is configured to receive both data and power from the power integrated network 206. With this configuration, any-to-any connectivity may be provided between the data storage device 202 and the other network devices in the power integrated network 206.

Figure 3:
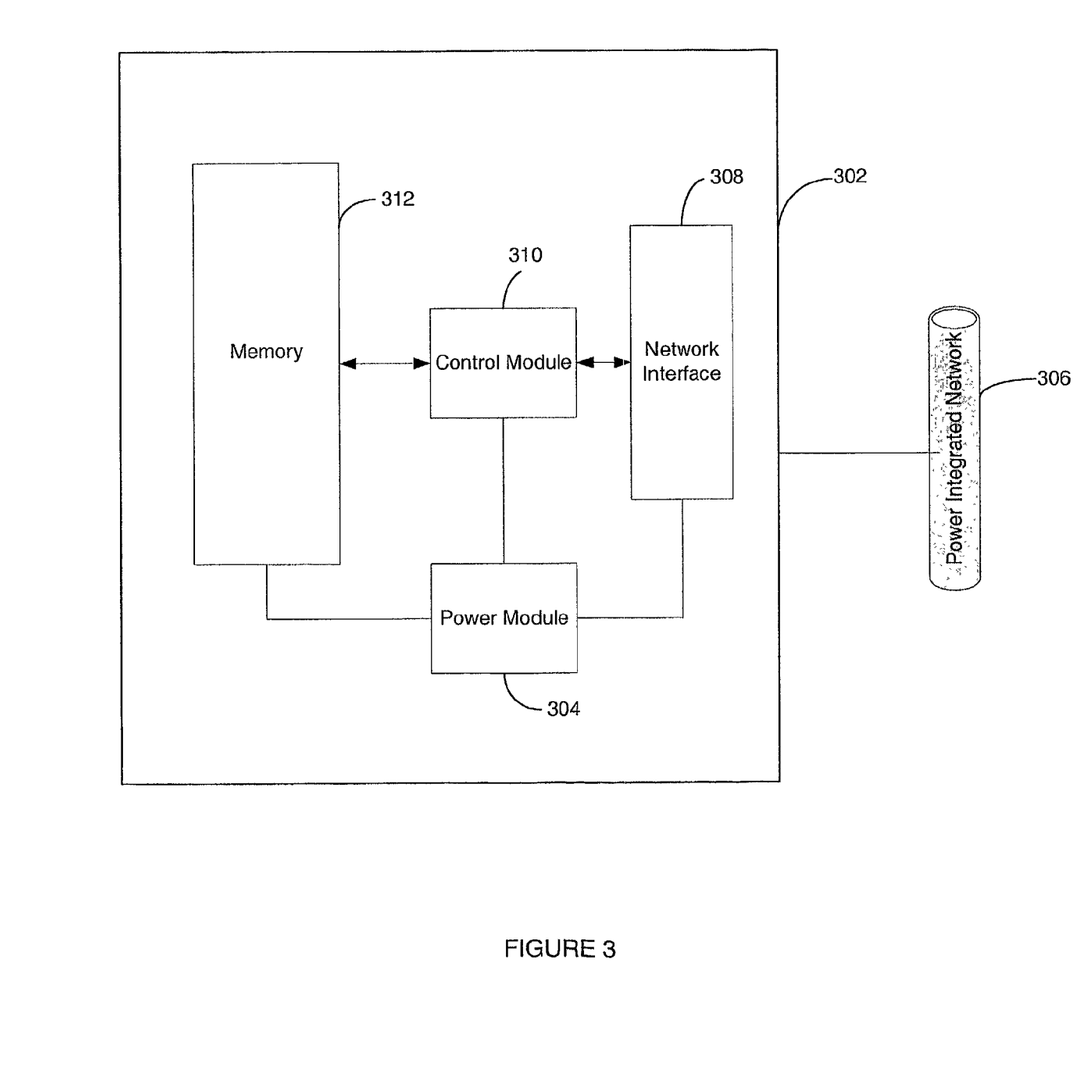
FIG. 3 is a schematic diagram of a data storage device for use in a power integrated network in accordance with an embodiment of the invention.

FIG. 3 is a schematic diagram of a data storage device in accordance with an embodiment of the invention. As discussed above, data storage device 302 is configured so that it may be connected to a power integrated network 306 to exchange data with the power integrated network 306 as well as receive power from the power integrated network 306.

Data storage device 302 includes, among other things, a network interface 308 to communicate data with the power integrated network 306. The network interface may be a physical interface such as, for example, a conventional plug for plugging into an Ethernet network or a computer card with the attendant functionality, and/or a software module that, when executing, performs the desired functions. When data is received by the data storage device, the network interface 308 forwards the data to a memory 312. Memory 312 is used for storing data. In embodiments of the invention, memory 312 may be any type of device used to store data, such as, for example, disk drives, tape drives, optical drives, RAMS's, other static memory devices and PCMCIA (Personal Computer Memory Card International Association) cards. In a further embodiment, memory 312 may be a device implementing the Small Computer System Interface (SCSI) standard.

A control module 310 is coupled to the memory 312 and the network interface 308. Control module 310 is used to control the transmission of data from the memory 312 to the power integrated network 306 and the storage of data received from the power integrated network 306 in the memory 312. Control module 310 communicates with the power integrated network 306 via the network interface 308. Control module 310 may utilize protocols, known in the art, that permit communication between a SCSI device and a local area network, such as an Ethernet network. One such protocol is described in an IETF Internet draft document entitled "The SCSI Encapsulation Protocol (SEP)", which is referenced as draft-wilson-sep-00.txt (May 2000), and is herein incorporated by reference in its entirety. In illustrative embodiments, the control module is a software component executing on a microprocessor.

In one embodiment, control module 312 may also include registration logic (not shown) that is used to register with a central authority, such as a server, when the data storage device 302 is connected to the power integrated network 306. An exemplary registration process is disclosed in co-pending U.S. patent application Ser. No. 09/747,613, filed Dec. 21, 2000, entitled "Apparatus and Method for Confirming Physical Connection of a Network Device," which is hereby incorporated by reference. The control module may also include other logic not shown in FIG. 3. Control module 310 may include, for example, an IP stack for executing all network communication processes and multicast functionality.

The IP stack preferably includes the link layer, network layer and transport layer software and/or hardware that permits the data storage device to transmit to and receive data from the power integrated network. The multicast functionality may be implemented as a software device that implements one or more multicast protocols (e.g., Protocol Independent Multicast, also known as "PIM"). The multicast functionality permits the data storage device to transmit data message to other network devices on the power integrated network.

As discussed above, data storage device 302 may be powered by the power integrated network 306. Accordingly, the data storage device 302 also includes a power module 304 that receives power from the power integrated network 306. The power received may be used to energize the components of the data storage device 302. Power module 304 may include a power converter (not shown) to convert the voltage level of the power received from the power integrated network 306 to a voltage level that may be used by the various components of the data storage device 302. In one embodiment, the power received is a constant DC power supply. Accordingly, the power converter may be a DC power circuit that adjusts the voltage received from the power integrated network 306 to an appropriate level for the data storage device 302 and its components. For example, the DC power circuit may be a down converter that converts an incoming DC voltage to a lower DC voltage level.

Figure 4:
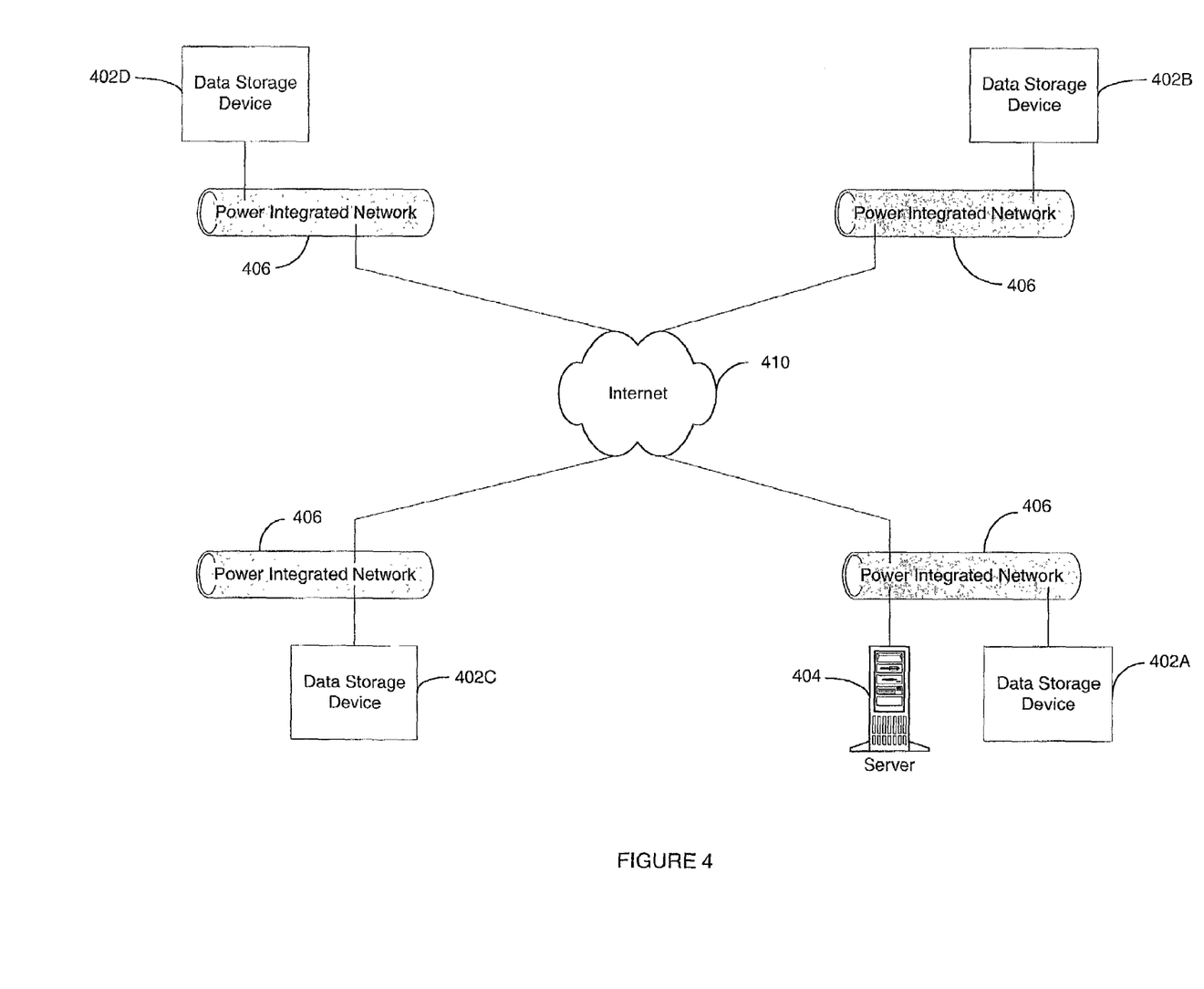
FIG. 4 is a schematic diagram of a redundant data storage system in accordance with an embodiment of the invention.

An application of the data storage device 302 is shown in FIG. 4. FIG. 4 is a schematic diagram of a redundant data storage system in accordance with an embodiment of the invention. Data storage devices 402A–D are each connected to a power integrated network 406 at a different physical location. Data storage devices 402A–D may be used in a RAID (Redundant Array of Independent Disks) configuration. In illustrative embodiments using a RAID 3 or RAID 5 configuration, for example, at least one of the data storage devices will include parity information. Each data storage device 402A–D may be connected to a power integrated network at a different physical location. For example, data storage device 402A may be connected to a network in New York; data storage device 402B may be connected to a network in Boston; data storage device 402C may be connected to a network in Los Angeles; and data storage device 402D may be connected to a network in Denver. A server 404 at one of the locations may be used as a host system. The data storage devices 402 in the RAID storage system will appear as one single device to the server 404. The data storage devices 402A–D may communicate with server 404 via a public network, i.e., the Internet 410 that is coupled to each power integrated network 406 and hence, to each data storage device 402A–D. In the system as shown in FIG. 4, if there is a physical failure at one location, the other data storage devices in the RAID array will not be affected by the failure. As mentioned above, each power integrated network 406 may be coupled to the Internet 410 to enable the data storage devices 402A–D and server 404 to communicate. The data storage devices 402A–D and server 404 may communicate over the Internet by means of a known protocol such as TCP/IP (Transmission Control Protocol with Internet Protocol).

Some aspects of the invention may be implemented at least in part in any conventional computer programming language. For example, some embodiments may be implemented in a procedural programming language (e.g., "c") or an object oriented programming language (e.g., "C++"). Alternative embodiments of the invention may be implemented as preprogrammed hardware elements (e.g., application specific integrated circuits, FPGAs, and digital signal processors), or other related components.

Thus, the present invention may be embodied as a data storage device for use in a power integrated network that includes a memory configured to store data and a control module coupled to the memory to control the transmission of data from the memory to the power integrated network and the storage of data received from the power integrated network in the memory. A power module coupled to the memory and the control module receives and converts power received from the power integrated network from a first voltage level to a second voltage level.

Embodiments of the present invention may be embodied as a method for providing data storage in a power integrated network that includes coupling a data storage device to the power integrated network where the data storage device is configured to communicate with the power integrated network. The method also involve receiving data and power at the data storage device from the power integrated network and using the power received from the power integrated network to energize the data storage device.

Embodiments of the present invention may also be embodied as a system for providing data storage in a communication network that includes a first power integrated network and a second power integrated network that provide data and power. The first power integrated network and the second power integrated network are both coupled to a specified network so that data may be transmitted from and received by each power integrated network across the specified network. A first data storage device is coupled to the first power integrated network and is configured to communicate with the first power integrated network and to receive power from the second power integrated network. A second data storage device is coupled to the second power integrated network and is configured to communicate with the second power integrated network and to receive power from the second power integrated network.

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims. It should be noted that although Power Ethernet and this IEEE standard are discussed, various embodiments are not limited to such standard. Accordingly, various embodiments can be used on other types of networks that transmit both power and data.

What is claimed is:

1. A data storage device for shared use in a power integrated Ethernet network, the data storage device comprising:
   a network interface coupled with the power integrated Ethernet network, the network interface operable to receive both power and data from the power integrated Ethernet network;
   a SCSI memory configured to store data;
   a SCSI Encapsulation Protocol control module coupled to the memory and the network interface, the control module being operable to control transmission of data from the memory to any one of a plurality of clients via the power integrated network, and further to control storage of data received from any one of the plurality of clients via the power integrated network in the memory; and
   a power module coupled to the memory, the network interface and the control module, the power module receiving power from the network interface to energize the memory and the control module, wherein the power module includes a power converter for converting the power received from the power integrated network from a first voltage level of the power integrated Ethernet network to a different, second voltage level to energize the memory and the control module.

2. A data storage device according to claim 1, wherein the control module packages data for transmission over the power integrated network.

3. A data storage device according to claim 1, wherein the second voltage level is lower than the first voltage level.

4. A method for providing shared data storage in a power integrated Ethernet network, the method comprising:
   with a SCSI data storage device coupled to a SCSI Encapsulation Protocol control module coupled to a network interface, the SCSI data storage device configured to communicate with any of a plurality of clients via the power integrated Ethernet network via the SCSI Encapsulation Protocol control module and the interface, receiving data and power at the interface data storage device from the power integrated network;
   with the network interface, providing data from the power integrated network to the SCSI Encapsulation Protocol control module, and providing power from the power integrated network to a power module;
   with the power module, converting the power received from the network interface from a first voltage level to a second, different voltage level; and
   using the converted power to energize the data storage device.

5. A method according to claim 4, wherein the second voltage level is lower than the first voltage level.

6. A system for providing shared data storage in a communication network, the system comprising;
   a first power integrated network that provides data and power;
   a specified non-power integrated network coupled to the first power integrated network so that data may be transmitted from and received by the first power integrated network across the specified network;
   a second power integrated network that provides data and power coupled to the specified network so that data may be transmitted from and received by the second power integrated network across the specified network;
   a first data storage device coupled to the first power integrated network, the first data storage device configured to communicate with the first power integrated network and to receive power from the first power integrated network, wherein the first data storage device comprises:
      a memory configured to store data;
      a control module coupled to the memory, the control module for controlling the transmission of data from the memory to any of a plurality of clients via the first power integrated network and the storage of data received from any of a plurality of clients via the first power integrated network in the memory; and
      a power module coupled to the memory area and the control module, the power module receiving power from the first power integrated network, wherein the power module includes a power converter for converting the power received from the power integrated network from a first voltage level to a second voltage level to energize the data storage device, and wherein the power module provides only power to the data storage device; and
   a second data storage device coupled to the second power integrated network, the second data storage device configured to communicate with the second power integrated network and to receive power from the second power integrated network.

7. A system according to claim 6, wherein the first storage device and the second storage device are in a RAID configuration.

8. A system according to claim 6, wherein the first power integrated network is a Power Ethernet network.

9. A system according to claim 6, wherein the second power integrated network is a Power Ethernet network.

10. A system according to claim 6, wherein the specified network is the Internet.

11. A system according to claim 6, wherein the first data storage device further includes a network interface coupled to the control module, the network interface configured to communicate with the first power integrated network.

12. A system according to claim 6, wherein the control module packages data for transmission over the first power integrated network.

13. A system according to claim 6, wherein the memory area is a device including a SCSI interface.

14. A system according to claim 6, wherein the second voltage level is lower than the first voltage level.

15. A system according to claim 6, wherein the second data storage device comprises:
   a memory configured to store data;
   a control module coupled to the memory for controlling the transmission of data from the memory to the second power integrated network and the storage of data received from the second power integrated network in the memory; and
   a power module coupled to the memory area and the control module the power module receiving power from the second power integrated network.

16. A system according to claim 15, wherein the second data storage device further includes a network interface coupled to the control module the network interface configured to communicate with the second power integrated network.

17. A system according to claim 15, wherein the control module packages data for transmission over the second power integrated network.

18. A system according to claim 15, wherein the memory area is a device including a SCSI interface.

19. A system according to claim 15, wherein the power module includes a power converter for converting the power received from the power integrated network from a first voltage level to a second voltage level.

20. A system according to claim 6, wherein the first voltage level is lower than the second voltage level.

* * * * *